(No Model.)
L. VANDERPANT.
MOLD FOR DENTAL PLATES.
No. 304,766. Patented Sept. 9, 1884.
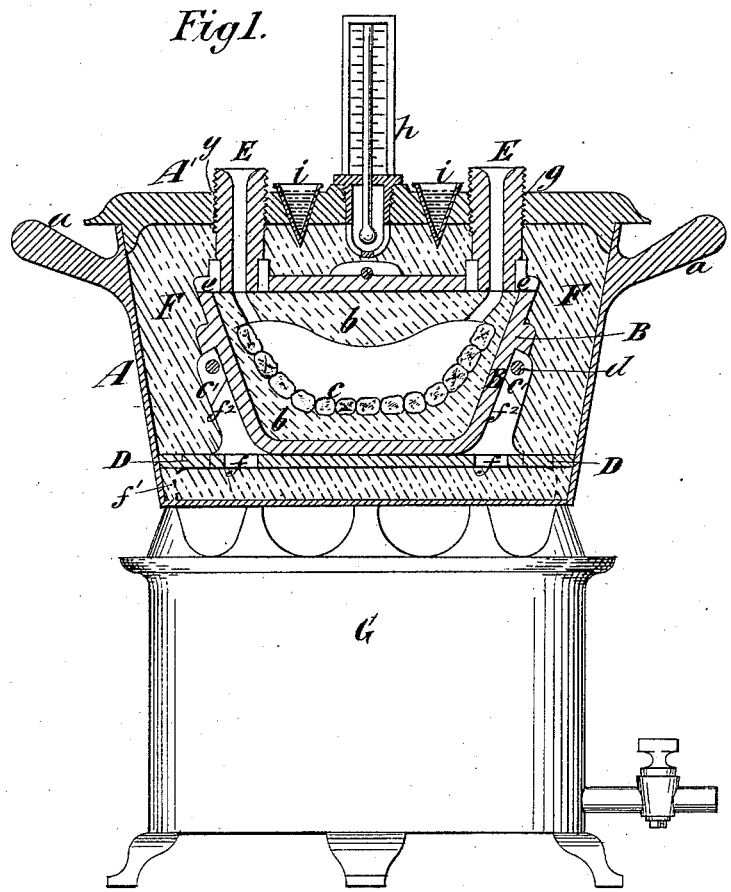
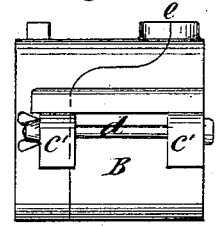
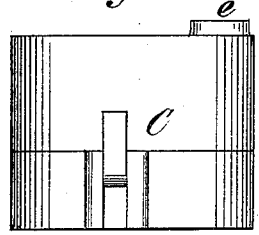
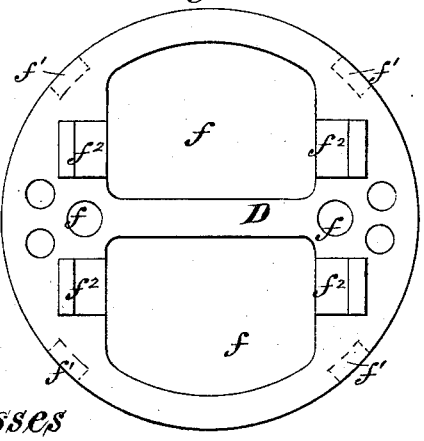
Witnesses
Ed. L. Moran
C. L. Lundgren
Inventor
Dr. Lawrence Vanderpant
by his Attorneys
Brown & Brown

UNITED STATES PATENT OFFICE.

LAWRENCE VANDERPANT, OF BRICK CHURCH, NEW JERSEY.

MOLD FOR DENTAL PLATES.

SPECIFICATION forming part of Letters Patent No. 304,766, dated September 9, 1884.

Application filed September 28, 1883. (No model.)

*To all whom it may concern:*

Be it known that I, LAWRENCE VANDERPANT, of Brick Church, in the county of Essex and State of New Jersey, have invented a new and useful Improvement in Apparatus for the Manufacture of Cast-Metal Dental Plates, of which the following is a specification.

My invention relates to the making of dental plates by what is well known as the "cheoplastic" or "cast-metal" process, and my apparatus I term the "positive cheoplastic fabricator." The cheoplastic method, although well known for many years, has never found favor with dentists, because of the difficulties and uncertainties of the process as heretofore carried out. The flask containing the plaster mold has been usually subjected to direct heat over a stove or in an oven, which methods of heating are objectionable, because the degree of heat is not ascertained or controlled, nor maintained at a uniform point, and when heated in an oven the flask must be removed for pouring, and thus has an opportunity to cool. When the flask is heated to too high a degree, the plastic mold or investment is liable to crack and the metal will not be retained, and when the flask is not hot enough the metal will bubble when poured.

The object of my invention is to effectually overcome the aforesaid objections, and to provide an apparatus in which the heat to which the flask is subjected may be accurately regulated and maintained at a uniform degree, thus enabling the cheoplastic process to be carried out with a certainty of success which has not before been possible.

The invention will be hereinafter described, and then pointed out in the claims.

In the accompanying drawings, Figure 1 is a vertical section of my apparatus and a side elevation of a stove whereon it is placed. Fig. 2 is a plan of a false bottom or removable skeleton plate or frame on which the flask is supported within the outer vessel. Fig. 3 is a side view of a flask which is to be poured, with the heel of the dental plate uppermost; and Fig. 4 is a similar view of a flask which is to be poured, with the plate in a horizontal position.

Similar letters of reference designate corresponding parts in all the figures.

A designates the outer vessel of my apparatus, which may be made of cast metal, and has a removable top or cover, A'. The vessel may be provided with handles $a$, whereby it is to be lifted. Within the vessel A is a flask, B, which contains the usual plaster mold or investment, $b$, in which are set the teeth $c$. The flask shown in the vessel is the one shown in Fig. 3, which is so constructed that the dental plate is cast with the heel uppermost. Its two parts are furnished with lugs $c'$, through which a bolt, $d$, may be passed to secure the parts together, as shown in Fig. 3. At the top of the flask B are hubs or sockets $e$, the purpose of which I will explain hereinafter. In lieu of the flask B, which is to be poured with the heel of the plate uppermost, I may use a flask, C, (shown in Fig. 3,) which is adapted for casting the plate in a horizontal position. This flask also has the hubs or sockets $e$; but they are on the side of the plate instead of at the heel.

D designates a false bottom or skeleton plate or frame which is placed in the vessel A. It is provided with numerous apertures $f$, as shown in Fig. 2, and with feet or flanges $f'$, by which it is supported on the bottom of the vessel A. On the top of the false bottom D is a saddle, in which the flask B rests. It is formed by pairs of prongs or fingers $f^2$, projecting upward from the false bottom and receiving the flask between them, as shown in Fig. 1. The lugs $c'$ of the flask B may rest upon these fingers $f^2$, as shown in Fig. 1.

E E designate gates or tubes which extend from the outside of the cover A' of the vessel A downward into the hubs or sockets $e$ of the flask B. One of them serves as a pouring-gate and the other as a vent-tube. As here shown, the said tubes are threaded externally and screwed into holes $g$ in the cover A', while their inner ends are shouldered, so as to enter snugly into and press down upon the hubs or sockets $e$.

Surrounding the flask B, and inclosed and retained by the vessel A, is a sand investment, F, which fills the space between the flask and the vessel, and the gates or tubes E pass through the sand investment and afford clear openings or passages from the exterior of the outer vessel to the interior of the flask B. The numerous apertures $f$ in the false bottom D enables the space below it to be entirely filled with sand, as shown in Fig. 1.

In the cover A' of the outer vessel are placed a thermometer, $h$, and small vessels $i$, containing metal which will melt or fuse at the temperature to which it is desired to heat the apparatus. When the metal in these vessels is discovered to be molten, it indicates that the apparatus is hot enough for pouring.

I may use both the thermometer and fusible metal as indicators of heat, or either one of them alone.

I have here shown the apparatus as mounted for heating upon a gas-stove, G; but it may be heated in any way desired.

I may adapt the heater used in carrying out what is known as the "Campbell New Mode" for the purposes of my invention, introducing the screw-threaded gates or tubes E in the place of two of the binding-screws used in said heater.

In some cases I may dispense with screw-threads on the gates or tubes E and make them of such size that they may be inserted snugly in place.

I have hereinabove stated that in making dental plates by the cheoplastic or cast-metal process the flask and mold have been subjected to direct heat over a stove or in an oven, and I have fully set forth the disadvantages of such methods of heating.

In my improved apparatus the flask and mold is not subjected to direct heat, but is inclosed within an outer vessel of larger size, and the heat is applied to this outer vessel.

The pouring and vent gates, consisting of tubes E, which extend from the exterior of the outer vessel through the space between the outer vessel and the flask and mold and into the said flask and mold, enable the molten metal to be poured into the flask and mold while they are still inclosed in the outer vessel.

By the use of the false bottom D, on which the flask and mold rest, the flask and mold are held out of contact with any part of the outer vessel, A, and hence no part of the flask and mold is liable to be heated to a greater degree than other parts.

By filling the space between the outer vessel and the flask and mold with sand the degree of heat transmitted to the flask or mold is rendered comparatively uniform, even though the degree of heat imparted by the stove G may fluctuate.

I am aware that it is not new to vulcanize rubber for dental and other purposes by surrounding the flask within which the rubber is placed with sand through which heat is transmitted to the flask; but in such case the rubber is placed in the flask prior to its being enveloped in sand, and I make no claim thereto.

In the use of my apparatus the flask and mold B is placed in the vessel A, the vessel is subjected to heat, and when heated to the required degree the molten metal is poured in through one of the tubes E, which extend from the exterior of the outer vessel to the flask and mold.

What I claim as my invention, and desire to secure by Letters Patent, is—

1. In an apparatus for making cast-metal dental plates, the combination, with a flask and its contained mold for the molten metal, the flask being provided with the hubs or sockets $e$, of a closed outer vessel, within which the flask is placed, and which is adapted to be heated externally, said vessel having screw-threaded holes $g$ in its top, and the pouring and vent gates consisting of tubes E E, screwed into the holes $g$ and entering the hubs or sockets $e$ in the flask, whereby provision is afforded for pouring metal through one of said tubes into said flask without opening the said outer vessel and while the flask is inclosed therein, substantially as herein described.

2. The combination of the vessel A A', the skeleton false bottom D, provided with feet $f'$, and with upwardly-projecting fingers or prongs $f^2$, forming a saddle, the flask B resting in said saddle, and pouring and vent gates consisting of tubes E E, extending through the top A' of said vessel and entering said flask, substantially as herein described.

LAWRENCE VANDERPANT.

Witnesses:
FREDK. HAYNES,
ED. L. MORAN.